(12) United States Patent
Choi et al.

(10) Patent No.: US 12,341,215 B2
(45) Date of Patent: Jun. 24, 2025

(54) BATTERY MODULE AND BATTERY PACK INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 675 days.

(21) Appl. No.: 17/623,690

(22) PCT Filed: Aug. 11, 2020

(86) PCT No.: PCT/KR2020/010597
§ 371 (c)(1),
(2) Date: Dec. 29, 2021

(87) PCT Pub. No.: WO2021/075688
PCT Pub. Date: Apr. 22, 2021

(65) Prior Publication Data
US 2022/0271388 A1     Aug. 25, 2022

(30) Foreign Application Priority Data
Oct. 18, 2019 (KR) .................. 10-2019-0129948

(51) Int. Cl.
*H01M 50/308* (2021.01)
*H01M 50/271* (2021.01)

(52) U.S. Cl.
CPC ....... *H01M 50/308* (2021.01); *H01M 50/271* (2021.01); *H01M 2200/20* (2013.01)

(58) Field of Classification Search
CPC ............ H01M 50/204; H01M 50/207; H01M 50/209; H01M 50/358; H01M 50/30; H01M 50/308
See application file for complete search history.

(56) References Cited

U.S. PATENT DOCUMENTS

| | | | |
|---|---|---|---|
| 2004/0191615 A1 | 9/2004 | Johnson et al. |
| 2012/0114993 A1 | 6/2012 | Park et al. |
| 2012/0225335 A1 | 9/2012 | Naito et al. |
| 2014/0322583 A1 | 10/2014 | Choi et al. |

(Continued)

FOREIGN PATENT DOCUMENTS

| | | |
|---|---|---|
| CN | 1898819 A | 1/2007 |
| CN | 106410090 A | 2/2017 |

(Continued)

OTHER PUBLICATIONS

English translation of JP Publication 2009-016076, Jan. 2009.*

(Continued)

*Primary Examiner* — Brittany L Raymond
(74) *Attorney, Agent, or Firm* — Birch, Stewart, Kolasch & Birch, LLP (57) ABSTRACT

A battery module includes: a battery cell assembly including one or more battery cells, a rectangular tube-shaped module frame configured so as to house the battery cell assembly and cover four surfaces of the battery cell assembly; and a plurality of first vent holes formed at a corner part where two of the four surfaces meet.

5 Claims, 5 Drawing Sheets

(56) References Cited

U.S. PATENT DOCUMENTS

| | | |
|---|---|---|
| 2016/0141573 A1 | 5/2016 | Aoki et al. |
| 2016/0156004 A1 | 6/2016 | Kim et al. |
| 2016/0260947 A1 | 9/2016 | Amagai |
| 2017/0033341 A1 | 2/2017 | Chujo et al. |
| 2017/0033343 A1 | 2/2017 | Miyawaki |
| 2018/0047951 A1 | 2/2018 | Lee et al. |
| 2018/0269443 A1* | 9/2018 | Takahashi ............ H01M 50/262 |
| 2019/0245175 A1 | 8/2019 | Qin et al. |
| 2019/0288252 A1* | 9/2019 | Qin ..................... H01M 50/296 |
| 2021/0126313 A1 | 4/2021 | Lee et al. |
| 2022/0077540 A1 | 3/2022 | Wakabayashi et al. |

FOREIGN PATENT DOCUMENTS

| | | | |
|---|---|---|---|
| CN | 104919621 B | | 10/2017 |
| CN | 208622884 U | | 3/2019 |
| CN | 208781972 U | | 4/2019 |
| CN | 209357802 U | | 9/2019 |
| JP | 62-98559 A | | 5/1987 |
| JP | 2002-124219 A | | 4/2002 |
| JP | 2009-016076 | * | 1/2009 |
| JP | 2009-16076 A | | 1/2009 |
| JP | 2011-204577 A | | 10/2011 |
| JP | 2012-104471 A | | 5/2012 |
| JP | 2014-93209 A | | 5/2014 |
| JP | 2015-509278 A | | 3/2015 |
| JP | 2015-125944 A | | 7/2015 |
| JP | 2019-140083 A | | 8/2019 |
| JP | 2019-160772 A | | 9/2019 |
| KR | 10-2009-0010393 A | | 1/2009 |
| KR | 10-2012-0081198 A | | 7/2012 |
| KR | 10-2014-0077811 A | | 6/2014 |
| KR | 10-2016-0148323 A | | 12/2016 |
| KR | 10-2019-0063109 A | | 6/2019 |
| WO | WO 2015/079496 A1 | | 6/2015 |
| WO | WO 2020/152992 A1 | | 7/2020 |

OTHER PUBLICATIONS

Extended European Search Report for European Application No. 20877487.7, dated Jun. 21, 2023.

International Search Report (PCT/ISA/210) issued in PCT/KR2020/010597 mailed on Nov. 30, 2020.

* cited by examiner

BATTERY MODULE AND BATTERY PACK INCLUDING THE SAME

TECHNICAL FIELD

Cross Citation with Related Application(s)

This application claims the benefit of Korean Patent Application No. 10-2019-0129948 filed on Oct. 18, 2019 with the Korean Intellectual Property Office, the disclosure of which is incorporated herein by reference in its entirety.

The present disclosure relates to a battery module and a battery pack including the same, and more particularly, to a battery module that can affect adjacent modules even when thermal runaway occurs and to a battery pack including the same.

BACKGROUND ART

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate, each being coated with the positive electrode active material and the negative electrode active material, are disposed with a separator being interposed between them, and an exterior material, that is, a battery case, which seals and houses the electrode assembly together with an electrolyte solution.

Generally, the lithium secondary battery may be classified based on the shape of the exterior material into a can type secondary battery in which the electrode assembly is built in a metal can, and a pouch-type secondary battery in which the electrode assembly is built in in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a battery management system (BMS) and a cooling system to form a battery pack.

When a plurality of battery cells are connected in series/parallel to configure a battery pack, a method of configuring a battery module composed of at least one battery cell and then adding other components to at least one battery module to configure a battery pack is common. The number of battery modules included in the battery pack, or the number of battery cells included in the battery module can be variously set according to a required output voltage or charge/discharge capacity.

On the other hand, when a battery pack is configured using a plurality of battery modules, if thermal runaway occurs due to abnormal operation such as overcharging in some of the plurality of battery modules, a high temperature gas and a flame are emitted to the outside of the battery module, which causes a problem that adjacent battery modules are damaged together.

DETAILED DESCRIPTION OF THE INVENTION

Technical Problem

The present disclosure has been devised to solve the above problems, and an object of the present disclosure is to provide a battery module that can minimize the influence on adjacent battery modules by dispersing the emitted high-temperature gas and flame even if thermal runaway occurs due to an abnormal operation, and a battery pack including the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell assembly including one or more battery cells, a rectangular tube-shaped module frame configured to house the battery cell assembly and having four surface to cover four surfaces of the battery cell assembly; and a plurality of first vent holes formed at a corner part where two of the four surfaces of the module frame meet.

The plurality of first vent hole may be located at a first corner part where a first surface of the module frame covering the upper surface of the battery cell assembly and a second surface of the module frame covering a first side surface of the battery cell assembly meet.

The plurality of first vent holes may be formed by removing a part of the first surface and a part of the second surface from the first corner part.

Two corner parts extend in a longitudinal direction of the module frame, and the plurality of first vent holes may be respectively formed at the two corner parts.

The first vent holes formed at the two corner parts may be formed at positions symmetrical to each other in the longitudinal direction of the module frame.

The first vent holes formed at the two corner parts may be formed at positions deviated from each other in the longitudinal direction of the module frame.

The module frame may include openings located at ends in a longitudinal direction of the battery cell assembly, and the battery module may further include an end plate coupled to the opening; and a plurality of second vent holes are formed in the end plate.

The plurality of first vent holes may be formed in one or more number at one corner.

According to another embodiment of the present disclosure, there can be provided a battery pack comprising: at least one battery module; and a pack case for packaging the above-mentioned at least one battery module.

According to yet another embodiment of the present disclosure, there can be provided a device comprising the above-mentioned at least one battery pack.

Advantageous Effects

According to the embodiment of the present disclosure, even if thermal runaway occurs due to an abnormal operation, the influence on adjacent battery modules can be minimized by dispersing the emitted high-temperature gas and flame, thereby preventing damage to the adjacent battery module.

DETAILED DESCRIPTION OF THE EMBODIMENTS

Hereinafter, various embodiments of the present disclosure will be described in detail with reference to the accompanying drawings so that those skilled in the art can easily carry out them. The embodiments of the present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Figure 1:
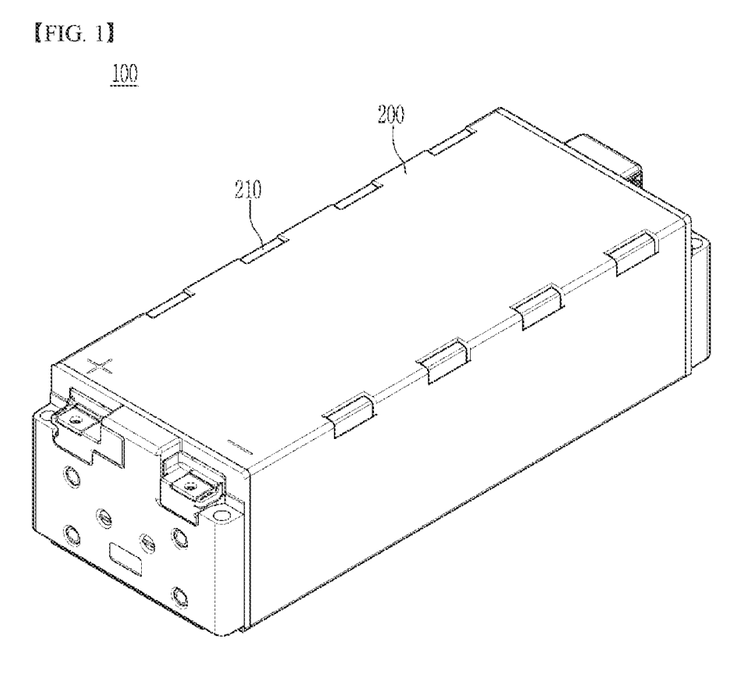
FIG. 1 is a perspective view of a battery module according to one embodiment of the present disclosure.
Figure 2:
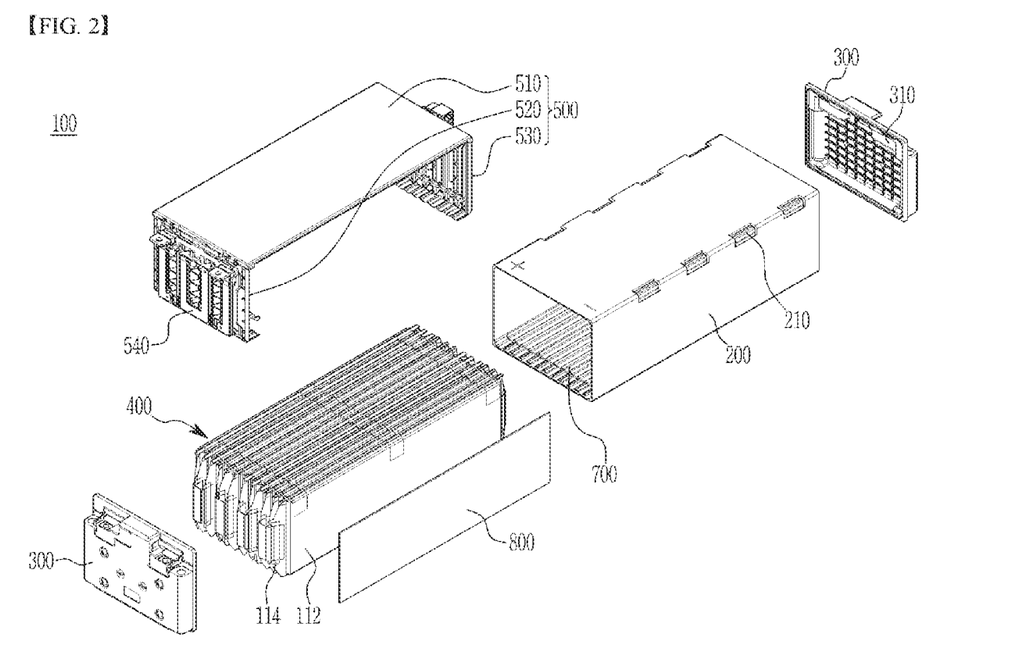
FIG. 2 is an exploded perspective view of the battery module of FIG. 1.

FIG. 1 is a perspective view of a battery module 100 according to one embodiment of the present disclosure, and FIG. 2 is an exploded perspective view of the battery module 100 of FIG. 1.

Referring to FIGS. 1 and 2, the battery module 100 according to one embodiment of the present disclosure includes a battery cell assembly 400 including one or more battery cells, a module frame 200 for housing the battery cell assembly 400 and end plates 300 that are located at both ends in the longitudinal direction of the battery cell assembly 400 and are coupled to the opening of the module frame 200.

The battery cell assembly 400 is an assembly of secondary batteries including a plurality of battery cells 112. The battery cell assembly 400 may include a plurality of battery cells 112, and each battery cell includes an electrode lead 114. The battery cell 112 may be a pouch-type battery cell having a plate shape, but is not limited thereto. The electrode lead 114 is a positive electrode lead or a negative electrode lead, and the end part of the electrode lead 114 of each battery cell 112 may be bent in one direction, and thereby can make contact with an end part of an electrode lead of another adjacent battery cell 112. The two electrode leads 114 that are in contact with each other can be fixed by mutual welding or the like, whereby an electrical connection can be made between the battery cells 112 in the battery cell assembly 400.

Further, the battery module may be provided with a busbar frame 500 housed in the module frame 200 together with the battery cell assembly 400. The busbar frame 500 may include an upper frame 510 located above the cell assembly 400, a front frame 520 located on the front side of the battery cell assembly 400, and a rear frame 530 located on the rear surface side of the battery cell assembly 400. A busbar 540 connected to the electrode leads 114 of the battery cells constituting the battery cell assembly 400 can be mounted on the front frame 520 and the rear frame 530.

The plurality of battery cells 112 are stacked so that the electrode leads 114 are aligned in one direction, thereby forming the battery cell assembly 400. The battery cell assembly 400 is housed in the module frame 200 having at least one opening that is opened in the longitudinal direction of the battery cell assembly 400. At this time, the electrode leads 114 are drawn out to the outside of the module frame 200 through the opening, and the drawn electrode leads 114 may be coupled to the front frame 520 and the rear frame 530 of the busbar frame 500, respectively, and can be electrically connected to the busbar 540 mounted therein. Here, the busbar frame 500 is formed of an insulating material, for example, a non-conductive synthetic resin, and the busbar 540 may be formed of a conductive metal material.

Further, the battery module 100 includes a flexible printed circuit board (FPCB) (not shown) that is extendedly mounted in the longitudinal direction of the battery cell assembly 110 at the upper part of the battery cell assembly 400 and is configured so as to sense the battery cell 112.

In addition, the battery module 100 may include various electronic components. As an example, it may include an ICB (Internal Circuit Board) and a BMS (Battery Management System).

Electrical components such as the ICB and BMS board may be electrically connected to the plurality of battery cells 112.

The battery module 100 may further include a thermally conductive resin layer 700 located between the lower surface of the battery cell assembly 400 and the module frame

200. The thermally conductive resin layer 700 is formed by injecting thermally conductive resin, and performs the role of transferring heat generated from the battery cell assembly 400 to the bottom of the battery module 100 and the role of fixing the cell assembly 400 within the battery module 100.

Meanwhile, a heat sink 800 is provided on the side surface of the battery cell assembly 400 and may be housed together in the module frame 200, but is not particularly limited.

In the battery module 100 according to this embodiment, the module frame 200 includes a plurality of first vent holes 210.

As shown in FIGS. 1 and 2, the plurality of first vent holes 210 are formed at the corners where two of the four surfaces of the module frame 200 meet. That is, the module frame 200 includes an upper surface covering the upper part of the battery cell assembly 400 and a lower surface covering the lower part, includes two side surfaces connecting the upper surface and the lower surface, and has a rectangular tube shape in which both end parts in the longitudinal direction are opened. Among them, a plurality of first vent holes 210 are formed at the two corner parts where two side surfaces and an upper surface meet.

The first vent hole 210 has a shape in which a part of the upper surface of the module frame 200 and a part of the side surface of the module frame 200 are removed from the corner part. That is, the first vent hole 210 is not formed on one surface of the module frame 200, but on first vent hole 210 is formed over two surfaces. According to such a configuration, even if pressure is applied in the up-down direction or left-right direction during the production process or use process of the battery module 100, the load applied to the first vent hole 210 is reduced, and therefore, even if a plurality of first vent holes 210 are formed, the influence on the rigidity or the like of the battery module 100 can be minimized.

The plurality of first vent holes 210 may be formed at each of the two corner parts along the longitudinal direction of the module frame 200, wherein the plurality of first vent holes 210 formed at the two corner parts may be formed at symmetrical positions so as to face each other as shown in FIGS. 1 and 2. The number and size of the first vent holes 210 are not particularly limited, and can be appropriately selected in consideration of the specifications of the battery module 200, the rigidity of the module frame 200, the usage environment, and the like. For example, one or more first vent holes 210 may be formed at one corner. When the first vent hole 210 is formed only at one corner, it is difficult to expect the effect of high temperature gas and flame dispersion, and therefore, it is preferable that at least one first vent hole 210 is formed at each corner part.

Meanwhile, the end plate 300 may be coupled to the opening of the module frame 200. A plurality of second vent holes 310 are formed in the end plate 300. A plurality of second vent holes 310 may be formed in both side end plates 300, and may be formed only in one side end plate 300. In terms of more effectively dispersing hot gas and flame, it is more preferable to be formed on both side end plates 300. The second vent hole 310 is not configured only to disperse high-temperature gas and flame like the first vent hole 210, but a hole formed for exposing an existing busbar terminal or the like to the outside of the end plate 300 may function as a vent hole.

Figure 3:
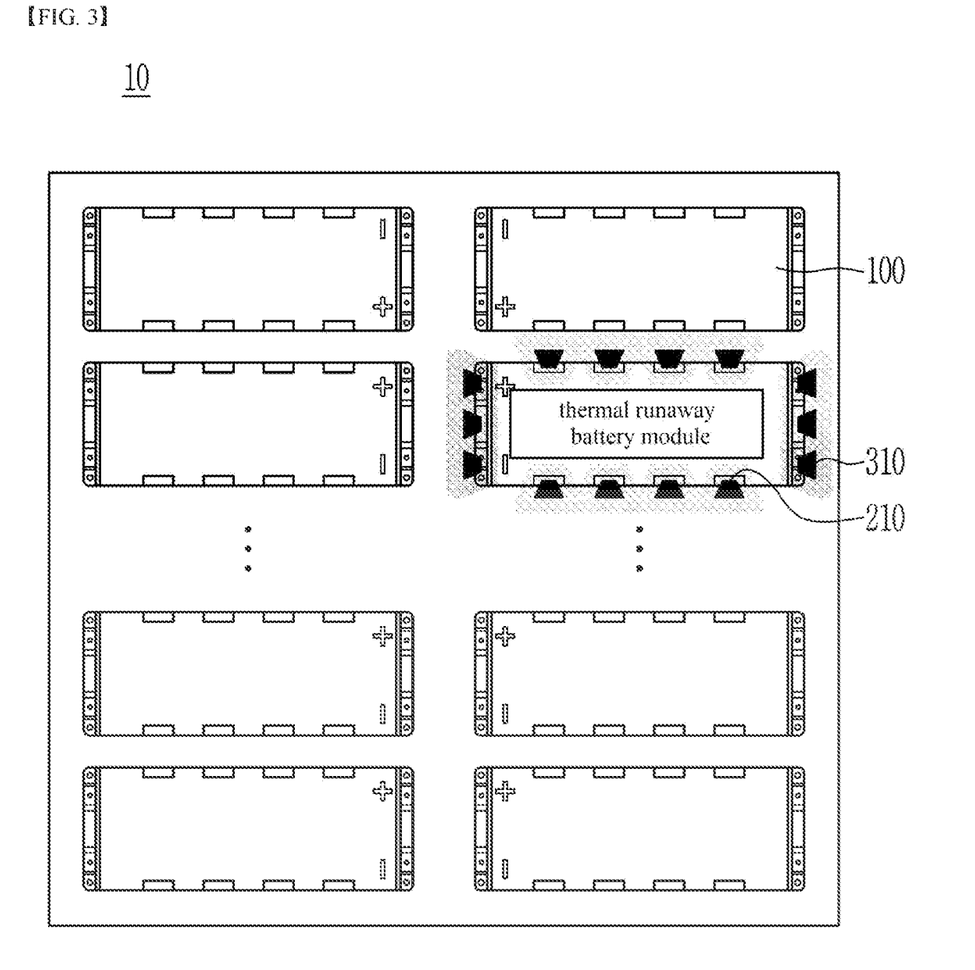
FIG. 3 is a diagram for explaining the case in which thermal runaway occurs in a battery pack according to one embodiment of the present disclosure.
Figure 4:
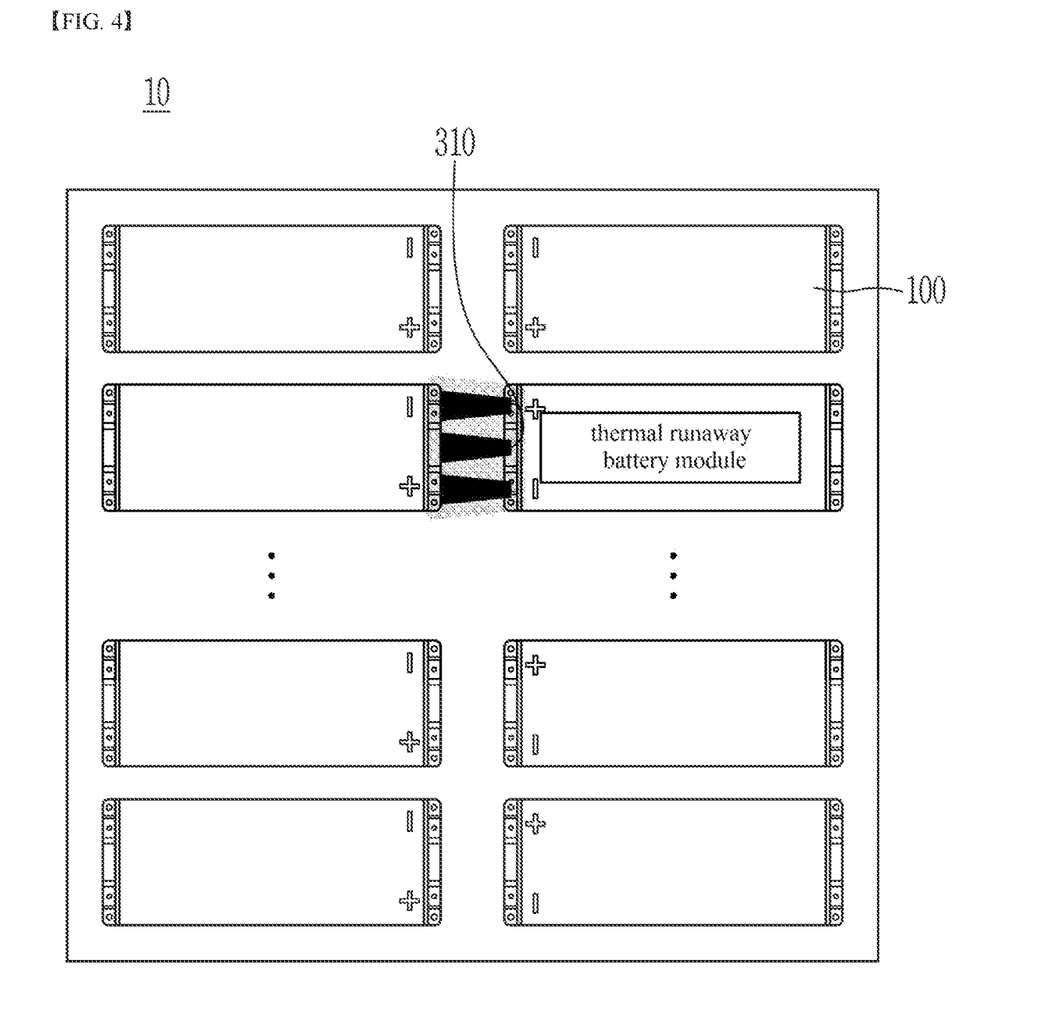
FIG. 4 is a diagram for explaining the case in which thermal runaway occurs in a battery pack according to a comparative example.

FIG. 3 is a diagram for explaining the case in which thermal runaway occurs in a battery pack according to one embodiment of the present disclosure, and FIG. 4 is a diagram for explaining the case in which thermal runaway occurs in a battery pack according to a comparative example.

As shown in FIG. 3, the battery pack 10 includes a plurality of battery modules 100 adjacent to each other. At this time, as in one embodiment of the present disclosure, when a plurality of first vent holes 210 are formed at the corners of the module frame 200, the high-temperature gas and flame are dispersed in various directions with reference to the battery module 100 in which thermal runaway has occurred as shown in FIG. 3. Therefore, even if the battery module 100 located adjacent to the battery module 100 in which thermal runaway has occurred in the battery pack 10, it can be less affected by high temperature gas and flame.

Meanwhile, as shown in FIG. 4, when a separate vent hole is not provided or the vent hole 310 is formed only at the longitudinal end of the battery module 100, the high-temperature gas and flame from the battery module 100 in which thermal runaway has occurred are concentratedly emitted toward the longitudinal end part. Therefore, since heat is concentratedly transferred to the battery module 100 disposed adjacent to the corresponding position, and a high-temperature flame is easily propagated, the adjacent battery module 100 is also highly likely to be damaged, thereby reducing safety.

As described above, according to one embodiment of the present disclosure, even in the structure of the battery module 100 in which all six surfaces of the battery cell assembly 400 are wrapped by the module frame 200 and the end plate 300, it is possible to properly disperse and emit high-temperature gas and flame when thermal runaway occurs, thereby minimizing damage to adjacent battery modules and improving safety.

Figure 5:
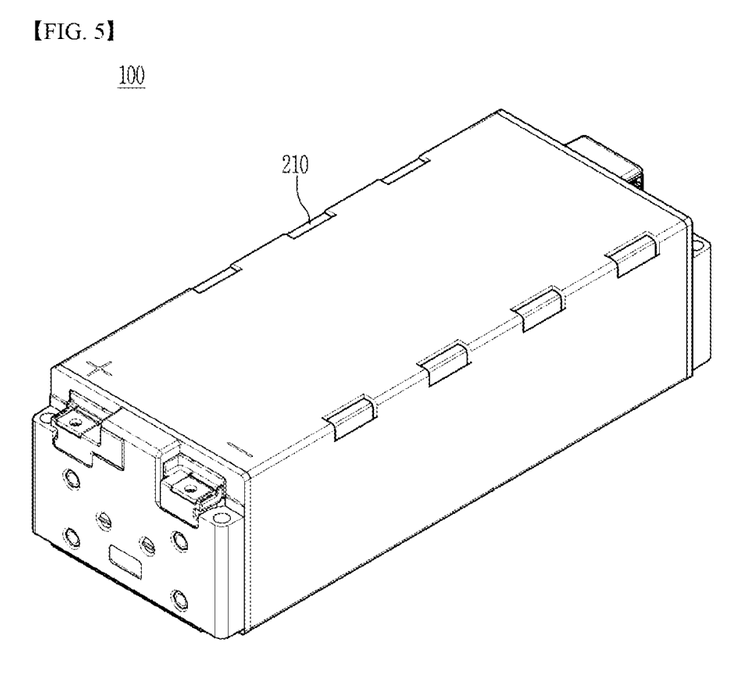
FIG. 5 is a perspective view of a battery module according to another embodiment of the present disclosure.

FIG. 5 is a perspective view of a battery module according to another embodiment of the present disclosure.

Referring to FIG. 5, in another embodiment of the present disclosure, the plurality of first vent holes 210 formed at the two corner parts may be formed at positions deviated from each other. When the plurality of first vent holes 210 formed at the corner parts facing each other in this way are arranged in a deviated manner, the first vent holes 210 are not adjacent to each other even if they are disposed adjacent to each other in the battery pack 10, as shown in FIG. 3, so that the influence by the thermal runaway battery module can be further reduced. That is, since the first vent holes 210 between adjacent battery modules 100 are not adjacent to each other, it is possible to minimize the direct propagation of the flame emitted from the thermal runaway battery module 100 to the first vent hole 210 of the adjacent battery module 100. The position and size of the first vent hole 210 is not particularly limited, and these can be appropriately changed so as to be suitable for the configuration of the battery module 100 and the battery pack 10.

As described above, according to one embodiment of the present disclosure, it is possible to disperse the divergence of high-temperature gas and flame from the battery module 100 in which thermal runaway has occurred, whereby the influence on the adjacent battery module 100 can be minimized and damage to the battery module 100 can be prevented, thereby improving safety.

Meanwhile, one or more of the battery modules according to embodiments of the present disclosure can be packaged in a pack case to form a battery pack.

The above-mentioned battery module and a battery pack including the same may be applied to various devices. These devices can be applied to vehicle means such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements made by those skilled in the art using the basic concepts of the present disclosure defined in the following claims also falls under the scope of rights.

DESCRIPTION OF REFERENCE NUMERALS

100: battery module
200: module frame
300: end plate
400: battery cell stack
210: first vent hole
310: second vent hole

The invention claimed is:

1. A battery module comprising:
   a battery cell assembly including one or more battery cells;
   a rectangular tube-shaped module frame configured to house the battery cell assembly and having a top surface, a bottom surface, a first side surface and a second side surface to cover four surfaces of the battery cell assembly, the first side surface spaced from the second side surface in a first direction; and
   a plurality of first vent holes formed at a corner part where the top surface meets each of the pair of side surfaces, each of the plurality of first vent holes extending into the top surface and a respective one of the pair of side surfaces,
   wherein the first vent holes in the first side surface are offset in a second direction from the first vent holes in the second side surface.

2. The battery module of claim 1, wherein the module frame comprises openings located at ends in a longitudinal direction of the battery cell assembly, and
   the battery module further comprises an end plate coupled to each opening; and
   wherein a plurality of second vent holes are formed in the end plate.

3. The battery module of claim 1, wherein the plurality of first vent holes are formed in one or more numbers at one corner.

4. A battery pack comprising:
   at least one battery module according to claim 1; and
   a pack case for packaging the at least one battery module.

5. A device comprising at least one battery pack according to claim 4.

* * * * *